United States Patent [19]

Watson, III

[11] Patent Number: 4,868,871
[45] Date of Patent: Sep. 19, 1989

[54] NONPARAMETRIC IMAGING TRACKER

[75] Inventor: Thomas M. Watson, III, Dallas, Tex.

[73] Assignee: Texas Instruments Incorporated, Dallas, Tex.

[21] Appl. No.: 85,053

[22] Filed: Aug. 13, 1987

[51] Int. Cl.$^4$ ............................................. G06K 9/68
[52] U.S. Cl. ....................................... 382/1; 358/126; 358/125
[58] Field of Search ....................... 382/1, 48; 358/126, 358/125, 105; 364/516

[56] References Cited

U.S. PATENT DOCUMENTS 4,364,089  12/1982  Woolfson ............................. 358/125
4,405,940   9/1983  Woolfson et al. .................... 358/126
4,739,401   4/1988  Sacks et al. ............................ 382/1

OTHER PUBLICATIONS

Schau, H. C., "Kolmogorov-Smirnov Test in Image Analysis", Optical Engineering, vol. 20, #2, 3/81.

Primary Examiner—Thomas H. Tarcza
Assistant Examiner—Ian J. Lobo
Attorney, Agent, or Firm—James T. Comfort; N. Rhys Merrett; Melvin Sharp

[57] ABSTRACT

A nonparametric imaging tracker is disclosed that first declares (10) a reference subimage comprising a plurality of image pixels, each pixel having a numerical light intensity level. The tracker then finds (12) a reference distribution of intensity levels in the reference subimage. A plurality of candidate subimages each having a plurality of pixels are then acquired (20). The intensity level distribution of each candidate subimage is compared to the reference distribution, and a statistic for each candidate subimage is computed based on this comparison (26, 28). One of the candidate subimages is then selected based on the value of its statistic (30, 36, 40). A preferred comparison and statistic calculation sequence includes the Kolmogorov-Smirnov test.

32 Claims, 1 Drawing Sheet

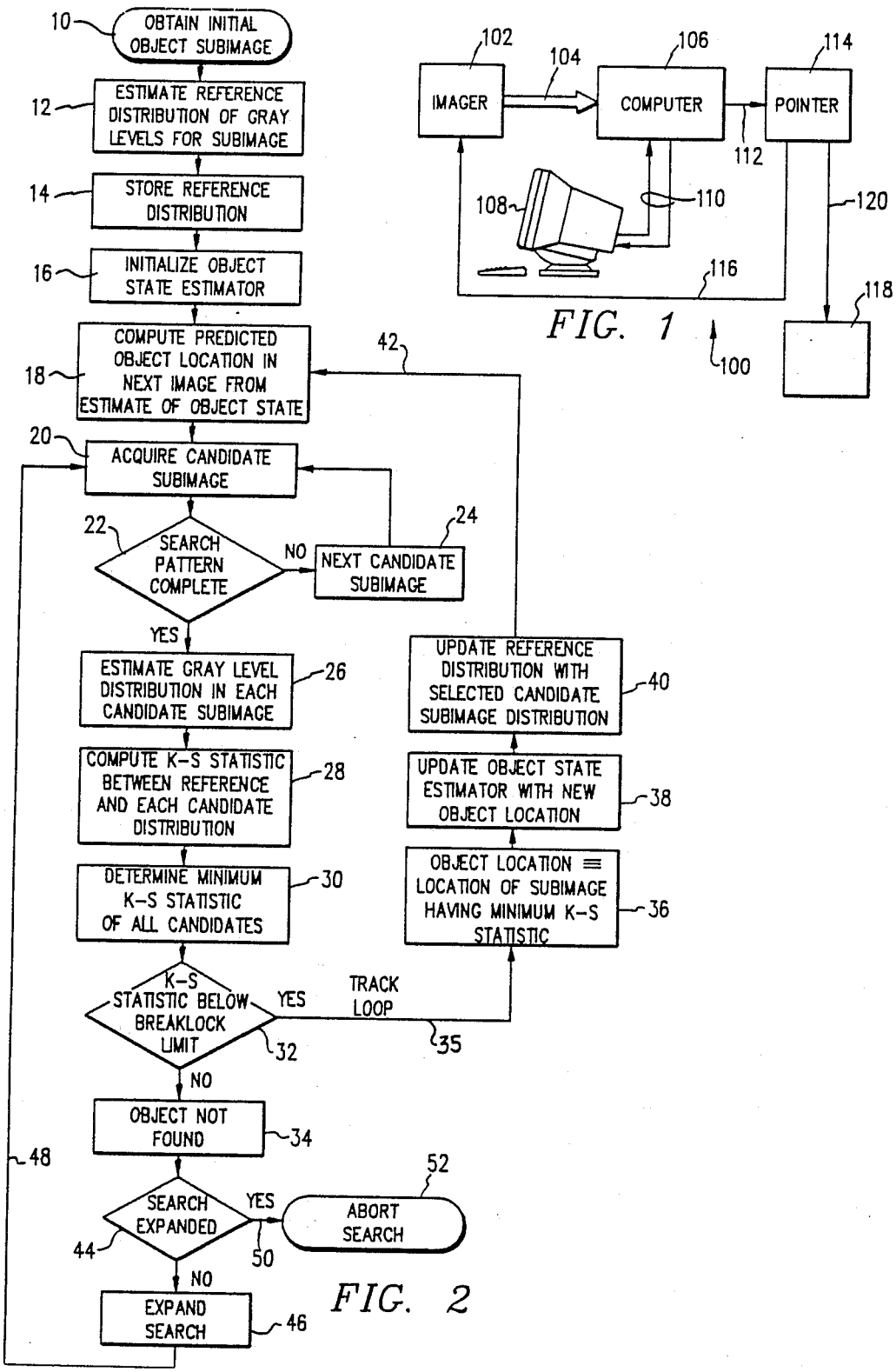

NONPARAMETRIC IMAGING TRACKER

TECHNICAL FIELD OF THE INVENTION

This invention relates in general to imaging trackers for tracking objects in imaged scenes, and more particularly relates to nonparametric imaging trackers based on comparison of gray level distributions between subimages.

BACKGROUND OF THE INVENTION

An imaging tracker is a device which locates an object in each of a sequence of images. An image is a representation of a two-dimensional signal; the value of the signal at a point in the image is its intensity. In typical applications of an imaging tracker, the image represents the spatially-varying energy intensity reflected or emitted from a scene, and an image sequence is an ordered series of these representations taken at consecutive points in time. Examples would include the reflected light intensity images output by a TV camera, the reflected RF energy level images output by a radar, and the emitted infrared energy level images output by a FLIR (Forward-Looking InfraRed sensor). Many conventional trackers assume that the object intensity in the image is different from the intensity of its surrounding area, and use this property to separate the two. Examples include the centroid tracker, the peak tracker, and the area balance tracker.

Another conventional tracker is the correlation tracker, which saves a subimage of the object and attempts to match this reference subimage to similar-sized subimages at various locations in the new image. The location giving the best match is the object's new location. The correlation tracker uses a point-by-point comparison of the intensities in the two subimages to obtain the best match.

Conventional correlation trackers suffer from several disadvantages. First, the correlation tracker assumes the addition of white Gaussian noise to corrupt the search images. Where the corrupting noise has other than a Gaussian distribution, the performance of the correlation tracker suffers.

Further, correlation tracker performance is degraded by magnification or rotation of the object image due to sensor motion. Also a large amount of data storage and a large number of computations are required by the correlation tracker, as each candidate subimage is compared to the reference subimage pixel by pixel.

The Kolmogorov-Smirnov (K-S) test has been discussed by H. C. Schau in "Kolmogorov-Smirnov Test In Image Processing," *Optical Engineering*, March/April 1981, Vol. 20, No. 2 (pp. 275–280). In this paper, Schau describes the application of the K-S test to detect an object within an image. Schau discloses the use of the K-S test for image segmentation and mentions in passing the possible application of the K-S test to tracking applications, but does not describe how this could be done.

A need has therefore arisen in the industry for a nonparametric imaging tracker that assumes no distribution for corrupting noise, whose performance is not degraded by magnification or rotation of the object image, and which requires much less data storage and fewer computations.

SUMMARY OF THE INVENTION

The present invention comprises a method and apparatus for tracking an object within a sequence of images. A reference subimage of the object is first declared which comprises a two-dimensional region of intensities representing the object to be tracked within an image in the sequence. An estimate of the probability distribution of the intensities within the reference subimage is next found; this is termed the reference distribution.

For each subsequent image in the sequence, a plurality of candidate subimages are acquired from the image, each candidate subimage being a two-dimensional region of intensities which could contain the object being tracked. An estimate of the probability distribution of the intensities within each candidate subimage is next found; these are termed candidate distributions. Each candidate distribution is compared to the reference distribution. Based on this comparison, a statistic for each candidate subimage is computed. Finally, one candidate subimage is selected based on its respective statistic.

In a preferred embodiment, the reference and candidate distributions are compared and the statistics are calculated according to the two-sided Kolmogorov-Smirnov (K-S) test. The two-sided K-S test determines the function which is the absolute value of the difference between the reference and a candidate distribution. The computed K-S statistic is equal to the largest value of this absolute difference function over all the intensity values represented in the two distributions.

In another aspect of the invention, the calculated statistic is used to determine whether the object has been found. A predetermined optimum numerical value for the statistics is established. If the best calculated statistic is not within a predetermined displacement of the desired value, a breaklock is declared, and the object is considered lost to the tracker. Thereafter, the search pattern may be expanded to acquire new candidate subimages, or the tracker may be allowed to "coast" to new predicted positions of the object in subsequent images until the object is reattained or the search aborted.

Another aspect of the invention comprises an updating of the reference distribution of the tracked object with data from the selected candidate distribution. The method by which the candidate distribution is used to update the reference distribution may be controlled by the confidence level indicated by the selected candidate subimage statistic. In a preferred embodiment, the new reference distribution is derived from a weighted average of the old reference distribution and the selected candidate subimage distribution. In a preferred embodiment, the weights attached to the old reference distribution and the selected candidate subimage distribution may further be made to vary as the confidence level indicated by the selected candidate subimage statistic.

The present invention has several advantages over conventional correlation trackers. First, while conventional correlation trackers perform best in additive white Gaussian noise, the K-S tracker assumes no distribution for the noise. It simply requires that the distribution of intensities in the object subimage be different from the distribution in the image surrounding it. A further technical advantage is conferred by the fact that the K-S tracker performance is not degraded by magnification or rotation of the object image due to sensor motion, conditions which severely degrade the goodness-of-fit measurement for a correlation tracker. Even changes in the object shape due to object motion (e.g. object turning) do not degrade the K-S tracker as long as the intensity distribution of the object is unchanged.

A further technical advantage of the K-S tracker is its much simpler implementation. The K-S tracker requires less data storage and fewer computations. While the correlation tracker must store a reference subimage of its target, the K-S tracker saves only the reference subimage distribution. For a sampled-image implementation with N pixels in the reference subimage and pixel intensity represented by one of P gray levels, the conventional correlation tracker requires $N \log_2 P$ bits to store a reference image, while $P \log_2 N$ bits are required by the K-S tracker to store its distribution.

For M candidate locations in a search image S, the conventional correlation tracker requires O(NM) operations. If each candidate subimage overlaps another by Q pixels, the K-S tracker computes the full distribution of only one candidate, and then derives the remaining candidate distributions from it. The computations of the K-S statistics for all of the distributions therefore requires $O((N-Q)M+N+P) \approx O((N-Q)M)$ operations. For large subimage overlaps, this is a small fraction of the computations required by the correlation tracker.

BRIEF DESCRIPTION OF THE DRAWING

Further aspects of the invention and their advantages may be discerned from the following detailed description taken in conjunction with the drawing in which:

FIG. 1 is a block diagram of a nonparametric imaging tracker according to the invention; and FIG. 2 is a flowchart illustrating the various computational steps of the invention.

DETAILED DESCRIPTION

Referring first to FIG. 1, a schematic block diagram of a tracking apparatus employing the invention is indicated generally at 100. The apparatus includes an imager 102 that acquires images from a scene. Imager 102 may comprise a TV camera, a radar antenna, or a FLIR (forward-looking infrared sensor).

Imager 102 sends a stream of intensity data on a data path 104 to a computer 106. Data path 104 communicates intensity data to computer 106 for each of a plurality of pixels of the image received by imager 102. The intensity data for each pixel may vary continuously in analog fashion or may be digitized. Examples of such intensity data include light intensity images, in the case where imager 102 is a camera; reflected RF energy level images, in the case that imager 102 is a radar antenna; and emitted infrared energy level images, in the case that imager 102 is a FLIR.

Computer 106 is in the illustrated embodiment programmed with a program embodying most of the tracking functions of the invention. It temporarily stores the image data for any particular image as provided by imager 102. An operator 108, which can be a human operator interfacing with computer 106 through a CRT, designates an initial object subimage to be tracked. The designation of this subimage is communicated to computer 106 through data lines 110. The operator can alternatively be an autonomous acquisition device, such as is described in H. C. Schau, supra. The program of the invention may be implemented on a multipurpose computer 106 as is shown in FIG. 1, or may alternatively be implemented exclusively in dedicated digital electronic hardware, or in a combination of dedicated hardware and software. The invention can also be implemented with optical, electro-optical, optomechanical, or analog electrical hardware, or a combination of these types of hardware.

In the illustrated embodiment, computer 106 stores a reference distribution from the selected subimage and compares it to each of a plurality of candidate distributions in order to track an object as seen in imager 102. When a lock on an image is determined, computer 106 will communicate directional data through line 112 to a pointer 114. Pointer 114 in turn may direct imager 102 to point toward the locked-on subimage through line 116, and may further direct one or more other devices 118 by communicating directional data to them through line 120. Device or devices 118 may include such hardware as a gun turret, missile, navigation equipment, etc.

Referring now to FIG. 2, a flowchart diagraming the method of the invention is shown.

An initial subimage of the object to be tracked, such as a tank, is obtained at a beginning step 10.

The subimage obtained in 10 will comprise a plurality of pixels, each pixel having a gray level associated with it which represents the light intensity at that pixels' location in the image. The gray level will have a numerical value within a predetermined range, such as 0 (minimum intensity) to 63 (maximum intensity). This 64-level gradation is provided only by way of example.

After the reference subimage has been obtained, the program next proceeds to a step 12 wherein a gray level distribution for the reference subimage is estimated. The reference gray level distribution may be calculated in various ways. The simplest is to derive a gray level histogram for the reference subimage. The histogram is a linear array that has a plurality of gray level histogram members. Each gray level histogram member has a numerical value equal to the number of pixels in the reference subimage having that particular gray level.

The histogram is next integrated to produce a gray-level distribution.

The reference gray-level distribution is a linear array R that has a plurality of gray level distribution members computed from the reference histogram. Each gray level distribution member has a numerical value equal to the sum of the numerical values of all the histogram members whose gray level is less than or equal to the gray level of the distribution member being computed.

The reference gray level distribution provides a signature of the object to be tracked. The reference gray-level distribution may for example have a gray level member No. 22 with a value of 5, indicating that five pixels out of the reference subimage have this gray level or less. A gray level member No. 43 in this histogram may have a value of 33, indicating that the reference subimage contains 33 pixels with this or a lower gray level. A gray level distribution member No. 4 may have a value of zero, indicating that the reference subimage contains no pixels having this or a lower gray level.

For small subimages containing few pixels, it may be desirable to interpolate the input gray level distribution. This is because for small subimages with large variances in their gray level distribution, the corresponding histogram may be sparse, with only a few nonzero values randomly distributed among the gray level members. One method of interpolation is the "Parzen window" technique, in which the histogram may be interpolated by convolving a window function with it to estimate the true gray level density. The Parzen window estimation technique is more fully described in R. O. Duda and P.

E. Hart, "Pattern Classification and Scene Analysis", pp. 88-95 (Wiley, 1973.)

Thus, the raw gray level histogram at, for example, gray level member No. 22, may be ten pixels, while gray level member Nos. 20, 21, 23, and 24 may be zero. After application of the Parzen window technique using a rectangular (mean filter) window function of width 5 and amplitude 1/5, this spike at gray level No. 22 would be averaged over plus or minus two gray level members, i.e., gray level members Nos. 20-24 would each have an averaged value of two pixels. The Parzen window technique allows the estimation of a more true, corrected histogram from sparse data.

If a Parzen window or other probability density estimation technique is applied to either the reference gray level histogram or the candidate gray level histograms (described below), care must be taken to ensure that the scaling of the resulting estimate is the same for both the reference and candidate gray level histograms; this can be ensured by applying an identical estimation technique to all histograms. If a probability density estimation technique is applied to the reference gray level histogram, then the reference gray level distribution is computed from the estimate in a manner identical to that used for computing it from the reference gray level histogram. In either case, the reference gray level distribution is stored at step 14.

At step 16, an object state estimator is initialized. This is a module of the program which attempts to estimate the future location in the scene of the object to be tracked. Where the image sensor is stationary, this may be a relatively simple estimator; on the other hand, where the image sensor is moving as in the case of an aircraft, the dynamics of the sensor's own motion may be input into the object state estimator to arrive at a predicted next location of the object within the scene. At step 18, the object state estimator computes the projected object location in the next image from the last estimate of the object state or location. Step 18 defines a starting point for the search of the object to be tracked.

The method next proceeds to step 20, which is a beginning step in a search pattern sequence. A new image of the scene is input into the tracker. A subimage frame is moved from point to point in the new image according to a predetermined search pattern around the predicted object location. At selected loci along the search pattern, candidate subimages are acquired, each candidate subimage comprised of a plurality of image pixels.

After a candidate subimage has been acquired at step 20, the program asks at step 22 whether or not the search pattern has been completed. If not, the program branches to consider the next candidate subimage at step 24, and the next candidate subimage is acquired back at step 20. This procedure loops until the search pattern is completed.

After all candidate subimages in the search pattern have been acquired, a gray level distribution for each candidate subimage is found at step 26. As is the case in the reference gray level distribution, each candidate gray level distribution may be computed from a simple histogram of the pixels in the subimage, or it may be computed from a histogram as modified by an estimator such as a Parzen Window estimator.

In an alternative embodiment to steps 20-26, the gray level distribution for each candidate subimage may be found immediately after the subimage has been acquired, instead of calculating the distributions only after all subimages have been acquired. The distributions may even be calculated in parallel even as other subimages are being acquired. The exact implementation of steps 20-26 will depend on the speed and capacity of the host hardware.

At subsequent step 28, a Kolmogorov-Smirnov (K-S) statistic is calculated based on the absolute difference of the reference gray level distribution and each candidate gray level distribution. The K-S statistic may be calculated immediately after the acquisition of each candidate gray level distribution, or alternatively may be calculated for each candidate gray level distribution after all of the candidate gray level distributions have been acquired. The two-sided K-S statistic for each candidate subimage is calculated according to the following formula:

$$\Delta_2 = \underset{I}{MAX} |R_I - S_I|,$$

where R is a linear array of a plurality of gray level members corresponding to the reference gray level distribution; S is a linear array of gray level members corresponding to a candidate gray level distribution; and I is the distribution index number of the gray level members being considered.

In the two-sided K-S calculation, the value of each gray level member in the candidate gray level distribution is subtracted from the value of the corresponding gray-level member in the reference gray level distribution, the absolute value of the result is computed, and a resultant linear array of absolute difference is obtained. Thus, for example, candidate gray level distribution member No. 22 may have a value of 12, while reference gray level distribution member No. 22 may have a value of 10. The difference at this gray level member index is $|10-12| = |-2| = 2$. The two-sided K-S statistic is the maximum of the absolute difference values in the linear difference array.

The preferred K-S statistic is the $\Delta_2$ or two-sided K-S statistic, which computes the absolute value of the difference. A one-sided K-S statistic may also be used that has the formula:

$$\Delta_1 = \underset{I}{MAX} (R_I - S_I).$$

The $\Delta_1$ K-S statistic provides an unnormalized test that measures how much "brighter" the candidate subimage is in comparison to the reference subimage. Array S may alternatively be reversed with array R, in which case the $\Delta_1$ K-S statistic would be a measure of how much "darker" the candidate subimage is in comparison to the reference subimage.

The K-S statistic will become smaller as the "fit" between the candidate subimage and the reference subimage becomes closer, as it is based on a maximum difference between the gray level distributions of the reference subimage and the candidate subimage.

Other statistics based on comparisons between the reference distribution and the candidate distribution may be used, so long as a single number is obtained that measures the similarity between the distributions.

At succeeding step 30, the program determines the minimum of all of the K-S statistics for the candidate subimages. The location of the candidate subimage corresponding to the minimum K-S statistic will be declared as the new object location, if any new object location is declared at all.

The program then passes to a decision step 32, where the obtained minimum K-S statistic is compared against a breaklock limit. This program portion is designed to determine whether the statistic is within a predetermined displacement of the optimum value of the statistic. In the preferred embodiment where the statistic being calculated is the K-S statistic, the optimum value is zero. A breaklock limit is established an arbitrary displacement away from the optimum value. If the K-S statistic is above this limit, the program branches to a step 34 and declares that the object was not found in the initial search. If on the other hand, the K-S statistic is below the breaklock limit, the program branches through path 35 to a step 36, which defines the new object location as the location of the candidate subimage having the minimum K-S statistic. The object state estimator is then updated with the new object location at step 38.

In the next step 40, the reference gray level distribution is updated with data from the selected candidate subimage. This can be done in one of several ways. The selected candidate gray level distribution can simply replace the old reference distribution. On the other hand, a new reference gray level distribution can be compiled from the old gray level distribution and the selected candidate subimage gray level distribution according to a weighted average. The weights assigned to each of these gray level distributions may be arbitrary, or they may be constrained to vary as a function of the value of the K-S statistic derived for the selected candidate subimage. This is due to the fact that as the K-S statistic decreases, the confidence that the object has been found increases, and more weight should be accorded the new gray level distribution.

The tracker then proceeds via a path 42 to step 18, where the object state estimator takes the found object location and predicts a next object location. The tracker then loops from here as long as a lock on the object is maintained or until the tracker is deactivated.

Returning to step 34, in the instance that the object is not found the tracker branches to a decision point 44. This step determines whether or not the search pattern has been previously expanded. If not, a new, expanded search pattern is instituted at step 46. The tracker then loops by feedback path 48 to step 20 for the acquisition of further new candidate subimages. If the search has already been expanded, one embodiment of the tracker will branch to path 50 from step 44, and end the tracker activity at a search abort step 52. In another embodiment the search can further be expanded at step 46.

In a further embodiment, no search expansion is performed, but the image tracker is instead allowed to "coast", with further object locations being predicted in subsequent images based on the object state estimator. Then, if the object is picked up in an image, the tracking loop is reestablished from step 18 onward. If the image tracker has coasted for a predetermined period of time without acquiring the object, the search is aborted.

In another embodiment, optical or analog electronic processing techniques could permit the computation of continuous rather than sampled-data representations of the reference and candidate distributions and the target location prediction, greatly reducing the numerical computation required by the detailed description above.

In summary, a new nonparametric imaging tracker has been disclosed that preferably is based on the K-S image processing test. The K-S tracker of the invention requires smaller number of computations and a smaller storage area than conventional correlation trackers, and is more resistant to non-Gaussian noise patterns. The K-S tracker is relatively immune to image changes such as magnification or rotation of the object subimage, as detection is based on gray level frequency rather than gray level location in the subimage.

While preferred embodiments and their advantages have been disclosed in the above detailed description, the invention is not limited thereto but only by the scope and spirit of the appended claims.

What is claimed is:

1. An imaging tracker, comprising:
   means for declaring a reference subimage including a two-dimensional region of intensities within an image;
   means for determining a reference distribution of intensities in said reference subimage;
   means for acquiring a plurality of candidate subimages;
   means for determining a candidate distribution of intensities for each of said candidate subimages;
   means for comparing each said candidate distribution to said reference distribution;
   means for computing a statistic for each candidate subimage, said statistic being a single number based on the comparison of said candidate distribution and said reference distribution; and
   means for selecting one of said candidate subimages based on its respective statistic.

2. A nonparametric imaging tracker for tracking a designated object within a scene, comprising:
   an attainer for attaining a reference subimage of said object from an initial image of said scene;
   a finder for determining a reference intensity distribution for said reference subimage;
   an acquirer for acquiring a plurality of candidate subimages within an image received subsequent to receiving said initial image;
   said finder operable to determine an intensity distribution for each candidate subimage;
   a calculator for calculating a statistic for each candidate subimage, said statistic being a single number based on a comparison of a respective candidate intensity distribution with said reference intensity distribution; and
   a selector for selecting one of said candidate subimages as a subimage of said object based on the value of each said candidate statistic.

3. The tracker of claim 2, wherein said statistical distribution finder is operable to produce an intensity level histogram for said reference subimage and for each candidate subimage, each histogram being a compilation of the number of pixels in the sampled input image having a particular intensity level for each of a plurality of different intensity levels, each reference and candidate intensity distribution integrated from a respective histogram.

4. The imaging tracker of claim 3, wherein said finder further comprises an estimator for interpolating said histogram to obtain a corrected histogram, said corrected histograms input into said calculator.

5. The imaging tracker of claim 2, wherein a search pattern is derived by said acquirer from a predicted new position of said object, said acquirer is operable to acquire candidate subimages at selected points in said search pattern.

6. The imaging tracker of claim 2, wherein:
said reference intensity level distribution comprises a linear array having a plurality of reference gray level members, each candidate intensity distribution comprising a like linear array of candidate gray level members;
said calculator for each candidate subimage, computing the difference of each reference gray level member with respect to a respective candidate gray level member to produce an array of difference members, said calculator selecting one of said difference members as said statistic for the respective candidate subimage.

7. The imaging tracker of claim 6, wherein each said difference member comprises an absolute difference between a candidate gray level member and a respective reference of gray level member, said statistic of any candidate subimage comprising the largest of said absolute differences for the last said candidate subimage.

8. The imaging tracker of claim 2, wherein a statistic indicating a complete distribution match is equal to a predetermined optimum value, a predetermined breaklock limit for said statistic displaced from said optimum value, a breaklock indicator indicating that said object is not found if said statistic is not between said breaklock limit and said optimum value.

9. The imaging tracker of claim 8, wherein a search pattern is derived by said acquirer from a predicted new position of said object, said acquirer operable to acquire candidate subimages at selected points in said search pattern;
a search pattern expander for expanding said search pattern responsive to said breaklock indicator indicating that said object is not found, a new set of candidate subimages thereafter being acquired by said acquirer at selected points in said expanded search pattern.

10. The imaging tracker of claim 2, and further comprising:
an object location updater for updating the location of said object responsive to said selector selecting one of said candidate subimages.

11. The imaging tracker of claim 2, and further comprising:
a reference distribution updater for updating said reference distribution with data from said selected candidate subimage.

12. The imaging tracker of claim 11, wherein the value of said selected candidate subimage statistic is used to control the operation of said reference distribution updater.

13. The imaging tracker of claim 11, wherein said reference distribution updater synthesizes a new reference distribution based on a weighted average of a current reference distribution and said intensity distribution of said selected candidate subimage.

14. The imaging tracker of claim 13, wherein said reference distribution updater is operable to assign weights on said current reference distribution and said intensity distribution of said selected candidate subimage as a function of the value of said selected candidate subimage statistic.

15. A nonparametric imaging tracker for tracking an object within a scene, comprising:
an acquirer for acquiring an initial reference subimage of said object;
a quantifier for determining a gray level for each of a plurality of pixels in said reference subimage;
a finder for finding a reference gray level histogram of said reference subimage;
an integrator for integrating said reference gray level histogram to yield a reference gray level distribution of said reference subimage;
said acquirer operable to acquire a plurality of candidate subimages, each said candidate subimage having a plurality of pixels;
said quantifier operable to determine a gray level for each pixel in each candidate subimage, said finder operable to find a candidate gray level histogram for each candidate subimage, said integrator operable to integrate a candidate gray level distribution for each candidate subimage;
a calculator for calculating a Kolmogorov-Smirnov statistic for each candidate subimage;
a selector for selecting the lowest of said Kolmogorov-Smirnov statistics; and
an object location updater for updating the location of said object in said scene based on the location of said selected candidate subimage.

16. The imaging tracker of claim 15, wherein candidate subimages are each centered on respective loci in a search pattern based on a predicted new position of said object within said scene.

17. The imaging tracker of claim 15, wherein said Kolmogorov-Smirnov statistic for each candidate subimage is calculated based on the following formula:

$$\Delta_2 = \underset{I}{MAX} |R_I - S_I|$$

where R is a linear array of gray level members of a reference gray level distribution, S is a linear array of gray level members of a candidate gray level distribution, and I is a distribution index of said reference gray level members and said candidate gray level members.

18. The imaging tracker of claim 15, wherein said Kolmogorov-Smirnov statistic for each candidate subimage is calculated based on the following formula:

$$\Delta_1 = \underset{I}{MAX} (R_I - S_I)$$

where R is a linear array of gray level members of a reference gray level distribution, S is a linear array of gray level members of a candidate gray level distribution, and I is a distribution index of said reference gray level members and said candidate gray level members.

19. The imaging tracker of claim 15, wherein said Kolmogorov-Smirnov statistic for each candidate subimage is calculated based on the following formula:

$$\Delta_1 = \text{MAX}(S_I - R_I),$$
$$I$$

where R is a linear array of gray level members of a reference gray level distribution, S is a linear array of gray level members of a candidate gray level distribution, and I is a distribution index of said reference gray level members and said candidate gray level members.

20. A method for tracking an object in a scene comprising the steps of:
declaring a reference subimage of said object comprising a plurality of image pixels, each pixel having a numerical intensity level;
finding a reference distribution of intensity levels in the reference subimage;
acquiring a plurality of candidate subimages each having a plurality of pixels;
finding a candidate subimage distribution of intensity levels for each of the candidate subimages;
comparing each candidate subimage distribution to the reference distribution;
computing a statistic for each candidate subimage, said statistic being a single number based on said step of comparing; and
selecting one of the candidate subimages based on its respective statistic.

21. The method of claim 20, and further including the step of acquiring said reference subimage from an autonomous reference image attainer.

22. The method of claim 20, and further comprising the steps of:
finding a gray level histogram having a plurality of gray level histogram members for the reference subimage and for each candidate subimage;
computing a gray level distribution having a plurality of gray level distribution members for the reference subimage and for each candidate subimage based on numerical integration of the values of the respective gray level histograms; and
computing a statistic for each candidate subimage based on a comparison of each gray level distribution member of the reference distribution with a corresponding gray level distribution member of the respective candidate histogram.

23. The method of claim 22, and further including the steps of:
applying an estimator to each gray level histogram to obtain a corrected gray level histogram; and
using said corrected gray level histogram in said computation of said gray level distribution.

24. The method of claim 20, wherein said step of comparing distributions comprises for each candidate subimage, computing the absolute value of the difference of the value of each gray level member of the respective candidate distribution with a corresponding value of a gray level member of the reference distribution to obtain an array of absolute difference members.

25. The method of claim 23, wherein said step of computing the statistic for each candidate comprises the step of selecting the maximum of said gray level difference members.

26. The method of claim 20, wherein said step of comparing comprises the step of subtracting the value of each reference gray level distribution member from the value of a corresponding candidate gray level distribution member, to obtain an array comprising a gray level difference members.

27. The method of claim 26, wherein said step of computing the statistic for each candidate subimage comprises the step of selecting the maximum of said gray level difference members.

28. The method of claim 20, wherein said step of selecting one of the candidate subimages includes the further steps of:
determining the smallest of said candidate subimage statistics; and
selecting the candidate subimage corresponding to the smallest candidate statistic.

29. The method of claim 20, and further including the steps of:
selecting the candidate subimage statistic that is closest to an optimum value;
determining whether the selected statistic is within a breaklock displacement of the optimum value;
declaring the object not to be found if the selected statistic is not within the breaklock displacement; and
declaring a new object location to be the location of the corresponding candidate subimage if the selected statistic is within the breaklock displacement.

30. The method of claim 29, and further including the steps of:
if the object is declared not to be found, expanding a search pattern;
acquiring a new plurality of new candidate subimages centered on loci in the expanded search pattern; and
repeating said steps of comparing, computing, selecting and determining for the new candidate subimages.

31. The method of claim 29, and further including the steps of:
if the object is not found, acquiring a plurality of new candidate subimages from subsequent images; and
repeating said steps of comparing, computing, selecting and determining for the new candidate subimages.

32. A method for tracking an imaged object within a scene, comprising the steps of:
obtaining an initial reference subimage of the object comprising a plurality of pixels, each pixel having a numerical gray level;
finding a reference gray level histogram for the reference subimage;
computing a reference gray level distribution from the reference gray level histogram;
storing the reference gray level distribution;
acquiring a plurality of candidate subimages within a new image of the scene;
finding a candidate gray level histogram for each of the candidate subimages;
computing candidate gray level distribution from each candidate gray level histogram;
computing a Kolmogorov-Smirnov statistic $\Delta_2$ for each candidate subimage according to the following formula:

$$\Delta_2 = \text{MAX} |R_I - S_I|,$$
$$I$$

wherein R is a linear array of reference distribution gray level members, S is a linear array of candidate distribution gray level members, and I is a gray level member index;
selecting the smallest of the statistics; and
declaring a new object location in the scene based on the locus of the corresponding candidate subimage.

* * * * *